United States Patent [19]

Otouma et al.

[11] 3,928,049

[45] Dec. 23, 1975

[54] ALKALI-RESISTANT MINERAL FIBERS USEFUL FOR THE REINFORCEMENT OF VARIOUS MOULDED ARTICLES

[75] Inventors: Takashi Otouma; Susumu Aoki, both of Yokohama; Toshihiro Minaki, Yamato-kooriyama; Kenichi Shibata, Nara; Kentaro Mori, Tokyo, all of Japan

[73] Assignee: Japan Asbestos Co., Ltd., Japan

[22] Filed: July 2, 1974

[21] Appl. No.: 485,135

[30] Foreign Application Priority Data
July 19, 1973 Japan.................. 48-80491

[52] U.S. Cl. .............. 106/50; 106/52; 106/54
[51] Int. Cl.² ........................................ C03C 13/00
[58] Field of Search.................. 106/50, 52, 54

[56] References Cited
UNITED STATES PATENTS 3,736,162  5/1973  Chvalovsky et al................. 106/50
3,783,092  1/1974  Majumdar........................... 106/50
3,811,901  5/1974  Bacon................................. 106/52

FOREIGN PATENTS OR APPLICATIONS 249,577  12/1969  U.S.S.R............................... 106/50

OTHER PUBLICATIONS

Kirk–Othmer–Encyclopedia of Chem. Technology 22 (1970) Wiley & Sons, N.Y., p. 653.
Webster's New World Dictionary 1972, p. 904.

Primary Examiner—Winston A. Douglas
Assistant Examiner—William G. Wright
Attorney, Agent, or Firm—Wenderoth, Lind & Ponack

[57] ABSTRACT

This invention relates to an alkali-resistant mineral fiber usable as a reinforcing material in preparing calcium silicate-containing molded articles and cement- or gypsum-containing molded articles, which comprises 35 to 50% by weight of silica; 5 to 35% by weight of iron oxide and/or manganese oxide; and 7 to 19% by weight of zirconium oxide as essential components.

5 Claims, No Drawings

ALKALI-RESISTANT MINERAL FIBERS USEFUL FOR THE REINFORCEMENT OF VARIOUS MOULDED ARTICLES

The present invention relates to alkali-resistant mineral fibers useful for the reinforcement of various moulded articles.

This application is closely related to U.S. Patent application Ser. No. 362503 filed May 21, 1973 (based on Japanese Patent Applications Nos. 56836/72 and 129999/72) by the same assignee.

One advantage of the mineral fibers of this invention is that they have a remarkably high alkali-resistance in comparison to known glass fibers. Another advantage of the mineral fibers of this invention is that they can be produced cheaply and in large quantities using the blowing method or the spinner method, by which rock fibers or ceramic fibers are produced, using an electric furnace, a gas furnace or a coke furnace in which the raw material is heated to a molten state. The blowing method or the spinner method may be compared to the conventional drawing process in which a bushing is used to manufacture long glass filaments.

Heretofore, asbestos fibers have been used as reinforcing material for the manufacture of moulded articles such as boards and thermal insulations, made of, for example, calcium silicate-, cement- or gypsum-containing materials, which are relatively highly alkaline, since the asbestos fibers are crystalloid, chemically stable and undergo, in comparison to known glass fibers, little reduction in strength when subjected to the action of an alkali. Another reason for the continued use of asbestos fibers as the reinforcement in such articles is that a suitable replacement has not so far been commercially available.

However, the production of good quality, low cost asbestos has tended to decline in recent years. Moreover, when manufacturing asbestos fibers, the fine fibers tend to be cut and charged into the atmosphere, where they remain to cause potential health hazards and environmental pollution. For these reasons, it is becoming increasingly desirable to find an inorganic fiber which can be used in place of asbestos fibers. However, there has not previously been commercially developed an inorganic fiber which has resistance to alkalis and which is not affected by the hydro thermal treatment in alkali solution, and, for this reason, conventional asbestos fibers are still in common use.

We have now found a mineral composition which can be used to make fibers which are resistant to alkali and to the action of water at high temperatures and are superior in quality to known inorganic fibers other than asbestos fibers and the glass fibers as claimed in the above mentioned U.S. patent application.

Thus, the present invention consisits of a mineral composition, preferably in the form of a fiber, characterized by containing 35 to 50 % by weight of silica; 5 to 35 % by weight of iron oxide and manganese oxide; and 7 to 19 % by weight of zirconium oxide as essential components.

We have found that the mineral composition of this invention has a lower melting point than that of the glass fibers as claimed in the above mentioned U.S. patent application (that is, a glass composition comprising from 35 to 50 % by weight silica; from 25 to 45 % by weight aluminium oxide; from 7 to 19 % by weight zirconium oxide; and from 3 to 20 % by weight magnesium oxide), and consequently that consumption of fuels used in the manufacture of the fibers of this invention and hence manufacturing costs, can be lowered.

The working temperature of the mineral composition of this invention is 200° to 300°C lower than that of the glass fibers of the above mentioned U.S. patent application. That is, the mineral composition of this invention is fiberized at 1300° to 1500°C. Due to the fact that the mineral composition of this invention can be fiberized at such a lower temperature, 30 to 50 % of the fuel costs can be saved.

An object of this invention is to provide an alkali-resistant mineral fiber having a relatively low melting point, characterized by containing silica, iron oxide, manganese oxide and zirconium oxide as essential components, which can be produced cheaply and in large quantities using the blowing method or the spinner method, by which rock fibers or ceramic fibers are produced, using an electric furnace, a gas furnace or a coke furnace in which the raw material is heated to a molten state to be taken out as a narrow stream.

The principal constituents of the mineral composition of this invention are as follows:

1. The silica is used as the glass-forming oxide in an amount of from 35 to 50 %, preferably 38 – 50 % by weight based on the weight of the mineral composition. If the silica is used in an amount greater than 50 % by weight, it normally reduces the yield of fibers, as the viscosity of the glass melt will increase to an extent that it is difficult to draw the melt into fibers and, in addition, it is difficult to produce fibers of good quality, since the diameter of the fibers produced tends to increase. If silica is used in an amount less than 35 % by weight, the yield and the strength of the fibers is considerably reduced.

2. The iron oxide ($Fe_2O_3$ or $FeO$) and the manganese oxide ($MnO$) together act not only as a flux but also as a viscosity-adjuster to accelerate the fibering of the mineral composition and to increase the yield of fibers. The total amount of the iron oxide and the manganese oxide should be from 5 to 35 %, preferably 10 – 35 % by weight based on the mineral composition. If these constituents are used in an amount less than 5 % by weight, it is impossible to produce fibers at 1300° – 1500°C, and the melt is very hard to be fiberized and only to produce coarse and brittle fibers due to too high a viscosity. On the other hand, if these constituents are used in an amount greater than 35 % by weight, the viscosity of the glass melt is considerably decreased, and the yield of fibers, the strength of the fibers and their heat-resistance are all reduced.

3. The zirconium oxide improves the resistance of the mineral composition to corrosion by alkalis, such as sodium hydroxide or calcium hydroxide, and also improves the quality of the glass fibers, giving them a silky gloss and a soft feel. The zirconium oxide component is used in an amount of from 7 to 19 %, preferably 10 to 19 % by weight, based on the weight of the mineral composition. If zirconium oxide is present in the mineral composition in an amount greater than 19 % by weight, it tends to crystallize as the melt is blown and spun into fibers, which causes devitrification and reduced the strength of the fibers. Furthermore, if zirconium oxide is used in an amount less than 7 % by weight, the corrosion resistance, particularly the alkali resistance, of the fibers is reduced and they are therefore of little practical use. The optimum effect can be achieved when the zirconium oxide is used in an amount of about 15 %.

We have also found that certain fusion aids may be used as additional constituents of the mineral composition, in order to reduce the viscosity and working temperature of the melt, and to increase electric conductivity when an electric furnace is used, sufficiently to enable the melt to be processed into fibers in large quantities.

The fusion aids which may be used in the present invention are as follows:

1. alkali metal oxides, such as $Na_2O$ and $K_2O$, in an amount up to 7 % by weight;
2. alkaline earth metal oxides, such as CaO and MgO, in an amount up to 30 % by weight;
3. boric anhydride in an amount up to 5 % by weight;
4. calcium fluoride in an amount up to 5 % by weight;
5. titanium oxide in an amount up to 10 % by weight; and
6. alumina in an amount up to 15 % by weight.

One or more of these fusion aids can be used and, is used, they should be present in the mineral composition in an amount sufficient to have the desired effect. However, they should not be used in amounts exceeding the above specified amounts, or they may sometimes provide an adverse effect, for example, the reduction of the heat resistance of the mineral fibers.

The invention is further illustrated with reference to the following Examples, which show a calcium silicate heat insulator having the mineral fibers of this invention incorporated as a reinforcing material.

EXAMPLE 1

| Constituents | Composition (% by weight) |
|---|---|
| $SiO_2$ | 45.0 |
| $Al_2O_3$ | 7.5 |
| $ZrO_2$ | 15.0 |
| $Fe_2O_3$ | 18.5 |
| MnO | 3.5 |
| MgO | 2.9 |
| CaO | 5.5 |
| $Na_2O$ | 1.5 |
| $TiO_2$ | 0.6 |

Silica stone, alumina, zircon sand, iron ore, manganese oxide, magnesia clinker, lime stone, soda ash and titanium oxide were mixed so as to give the above composition, and the resultant mixture was melted in a cupola. The melt was then taken out as a narrow stream having a diameter of 5 mm and was fiberized by blowing under steam at a pressure of 7.5 kg/cm². The temperature of the melt was 1440°C. The fibers thus obtained had an average size of 4.3 $\mu$ in diameter and about 30 millimeters in length.

8 weight parts of the resulting fibers was mixed with 1000 weight parts of water with agitation to produce a homogeneous dispersion and then the dispersion was mixed with 40 weight parts of diatomaceous earth, 40 weight parts of slaked lime and 12 weight parts of bentonite to produce a homogeneous slurry. The slurry was heated at 90°C for about 2 hours to form a gel and then the gel was dehydrated and molded into a formed product. The formed product was subjected to a hydrothermal treatment in an autoclave for 7 hours in an atmosphere of saturated steam thereby to cause a hardening reaction. The formed product thus hydrothermally treated was dried to produce a calcium silicate-containing thermal insulation.

The thermal insulation was tested for density, modulus of rupture in the ordinary state and modulus of rupture after it was heated at 650°C. The test results are given in the following Table 1.

Comparative samples were prepared by repeating the procedure of Example 1 with the exception that the alkali-resistant mineral fibers of this invention were replaced with S-33-65 asbestos fibers, C-glass fibers, E-glass fibers or silica-alumina type ceramic fibers in the same amount.

Table 1

| | Heat insulators containing | | | | |
|---|---|---|---|---|---|
| | Alkali-resist-ant mineral fibers of Ex. 1 | * S-33-65 asbestos fibers | ** C-glass fibers (9 $\mu$ diameter) | *** E-glass fibers (7 $\mu$ diameter) | Silica-alumina ceramic fibers (4 $\mu$ diameter) |
| Density (g/cm²) | 0.20 | 0.20 | 0.24 | 0.22 | 0.25 |
| Modulus of rupture (kg/cm²) in the ordinary state | 7.1 | 7.5 | 2.4 | 1.8 | 2.5 |
| Modulus of rupture (kg/cm²) after heating at 650°C | 4.2 | 1.3 | 1.1 | 0.8 | 1.3 |

Note: *S-33-65 asbestos fibers are natural rock fibers having a grey, yellow or brown appearance, a chemical composition of 49–53 % by weight $SiO_2$; 1–7 % by weight MgO; 34–44 % by weight FeO; 2–9 % by weight $Al_2O_3$; 2–5 % by weight $H_2O$ and 0.5–2.5 % by weight $CaO + Na_2O$, a tensile strength of 150–250 kg/cm², an alkali resistance above 90 % and a strength maintenance below 10 % after heating at 650°C for 3 hours.

**C-glass fibers are fibers with considerable chemical resistance, especially to acids, which are used for making separators in storage batteries, retainers or filter cloths and which have the chemical composition: 65 % by weight $SiO_2$; 4.0 % by weight $Al_2O_3$; 14.0 % by weight CaO; 3.0 % by weight MgO; 5.0 % by weight $B_2O_3$; 8.0 % by weight $Na_2O$; 1.0 % by weight $K_2O$.

***E-glass fibers are fibers having superior electrical properties and heat resistance and are used for making electrical devices, artistic glass fibrics and reinforcing materials. Their chemical composition is; 54.0 % by weight $SiO_2$; 15.0 % by weight $Al_2O_3$; 17.0 % by weight CaO; 5.0 % by weightMgO; 8.0 % by weight $B_2O_3$; 0.6 % by weight $Na_2O$.

It is obvious from the data as shown in Table 1 that the thermal insulation prepared by using the mineral fibers of this invention as a reinforcing material is not inferior but superior to that prepared by using the conventional S-33-65 asbestos fibers, and further that the insulator of this invention is remarkably superior to those prepared by using the C-glass fibers, E-glass fibers or silica-alumina type ceramic fibers. The physical properties of the thermal insulation of this invention are substantially the same as those of the thermal insulation as claimed in the aforementioned U.S. patent application.

The mineral fibers prepared in Example 1 were treated in a saturated lime solution under a pressure of 10 kg/cm² (at 179°C) in an autoclave for 10 hours. The tensile strength of the treated fibers was 70 % (i.e. 60 kg/mm²) of that of fibers in the ordinary state.

The same tests were conducted on the conventional glass fibers and asbestos respectively. These results are shown in the following table.

| | Mineral fibers of this invention | S-33-65 asbestos fibers | C-glass fibers | E-glass fibers | Silica-alumina ceramic fibers |
|---|---|---|---|---|---|
| Maintenance (%) of tensile strength as compared with those of ordinary state | 70 | 90 | 20 | 10 | 25 |
| Tensile strength after treated in saturated lime solution/tensile strength of ordinary state | | | | | |

It is clear from the above table that the mineral fibers of this invention are highly alkali-resistant in conparison with the conventional glass fibers.

EXAMPLE 2

| Constituents | Composition (% by weight) |
|---|---|
| $SiO_2$ | 49.5 |
| $ZrO_2$ | 18.5 |
| $Fe_2O_3$ | 23.0 |
| MnO | 9.0 |

A mixture having the above composition was prepared, and was fiberized in accordance with the same procedure as in Example 1. Temperature of the smelt of the mixture was 1480°C. The fibers had an average size of 5.3 μ in diameter and about 45 mm in length. The fibers thus obtained were used as reinforcing material for a calcium silicate thermal insulation in the same manner as in Example 1, and the insulation thus obtained had the following physical properties.

Density (g/cm³) = 0.21
Modulus of rupture (kg/cm²) in the ordinary state = 6.8
Modulus of rupture (kg/cm²) after heated at 650°C = 4.4

As mentioned above, the alkali-resistant glass fibers of the present invention can be used for reinforcing concrete articles, gypsum articles and in the building and ceramic industries, where natural asbestos is commonly used.

The alkali-resistant mineral fibers of this invention is used effectively as a reinforcing material in the following weight ratios (% by weight):

Mineral fibers of this invention: calcium silicate = 5 – 30 : 95 – 70

Mineral fibers of this invention: concrete = 5 – 15 : 95 – 85

Mineral fibers of this invention: gypsum = 5 – 15 : 95 – 85

Although the present invention has been described with certain specific embodiments, it is to be understood that modifications and variations may be resorted to without departing from the spirit and scope of this invention as those skilled in the art will readily understand. Such modifications and variations are considered to be within the purview and scope of the appended claim.

What we claim is that:

1. An alkali-resistant glassy fiber usable as a reinforcing material in calcium silicate-containing molded articles and cement- or gypsum-containing molded articles, which consists essentially of 38 to 50.0% by weight of silica; 10 to 35% by weight of iron oxide and manganese oxide; and 15 to 19% by weight of zirconium oxide.

2. The alkali-resistant glassy fiber of claim 1, wherein the glassy composition contains an effective amount of at least one fusion aid selected from the group consisting of alkali metal oxides, alkaline earth metal oxides, boric anhydride, calcium fluoride, alumina and titanium oxide.

3. The alkali-resistant glassy fiber of claim 1, which consists essentially of 45.0 to 49.5% by weight of silica; 18.5 to 23.0% by weight of iron oxide, 3.5 to 9.0% by weight manganese oxide; and 15.0 to 18.5% by weight of zirconium oxide.

4. The alkali-resistant glassy fiber of claim 1 which consists of 45.0% by weight $SiO_2$, 7.5% by weight $Al_2O_3$, 15.0% by weight $ZrO_2$, 18.5% by weight $Fe_2O_3$, 3.5% by weight MnO, 2.9% by weight MgO, 5.5% by weight CaO, 1.5% by weight $Na_2O$ and 0.6% by weight $TiO_2$.

5. The alkali-resistent glassy fiber of claim 1 which consists of 49.5% by weight $SiO_2$, 18.5% by weight $ZrO_2$, 23.0% by weight $Fe_2O_3$ and 9.0% by weight MnO.

* * * * *